United States Patent [19]

Ichihara

[11] 4,253,752

[45] Mar. 3, 1981

[54] FOCUS CONDITION DETECTING DEVICE

[75] Inventor: Yutaka Ichihara, Tokyo, Japan

[73] Assignee: Nippon Kogaku K.K., Tokyo, Japan

[21] Appl. No.: 79,087

[22] Filed: Sep. 26, 1979

[30] Foreign Application Priority Data

Sep. 27, 1978 [JP] Japan .................... 53/118005

[51] Int. Cl.³ .................... G03B 3/10; G01J 1/20; G01C 3/08
[52] U.S. Cl. .................... 354/25; 250/201; 354/31; 356/4
[58] Field of Search .................... 354/25, 31; 355/56; 352/140; 250/201; 356/4

[56] References Cited

U.S. PATENT DOCUMENTS 4,189,232  2/1980  Asano et al. .................... 354/25 X Primary Examiner—Michael L. Gellner
Attorney, Agent, or Firm—Fitzpatrick, Cella, Harper & Scinto

[57] ABSTRACT

A focus condition detecting device comprises an image forming optical system for forming a light image of an object on a fixed focal plane, an element for separating a pair of light beams from the light beam from the object, a first and a second photoelectric converting element array disposed in the pair of light beams, a first function generator for generating a first function output and a second function output, a first multiplier for putting out the sum of an output resulting from multiplying the first photoelectrical output of the first photoelectric converting element array by the first function output and an output of the second photoelectric converting element array by the second function output, a first integrator for integrating the output of the first multiplier, a second function generator for generating an output equivalent to an output resulting from differentiating one of the first photoelectrical output and the first function output, a second multiplier for multiplying the other of the first photoelectrical output and the first function output by the output of the second function generator, a second integrator for integrating the output of the second multiplier, and a divider for dividing the output of the first integrator by the output of the second integrator.

5 Claims, 12 Drawing Figures

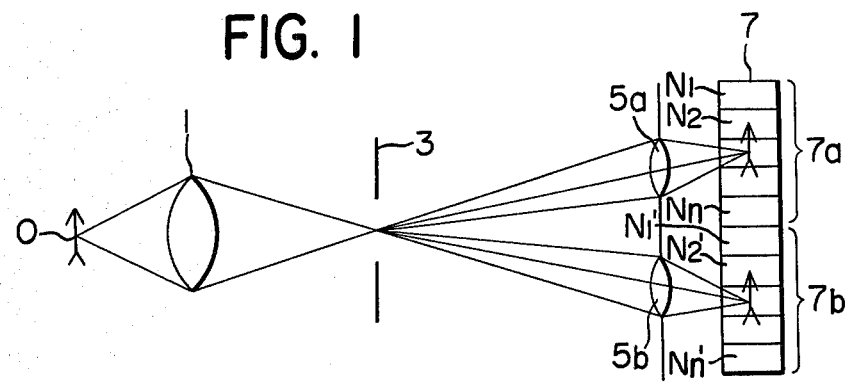
FIG. 1
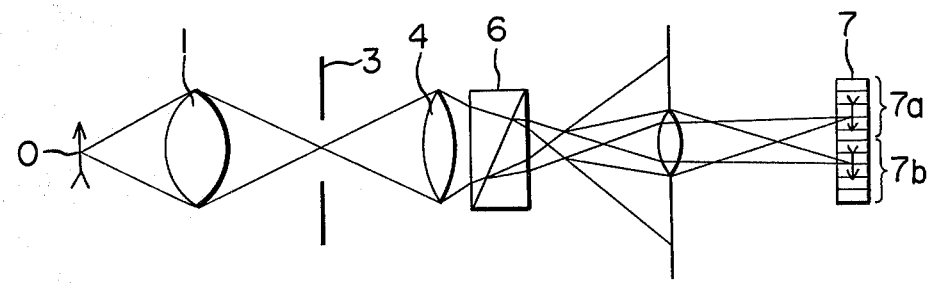
FIG. 2
FIG. 7
PRIOR ART
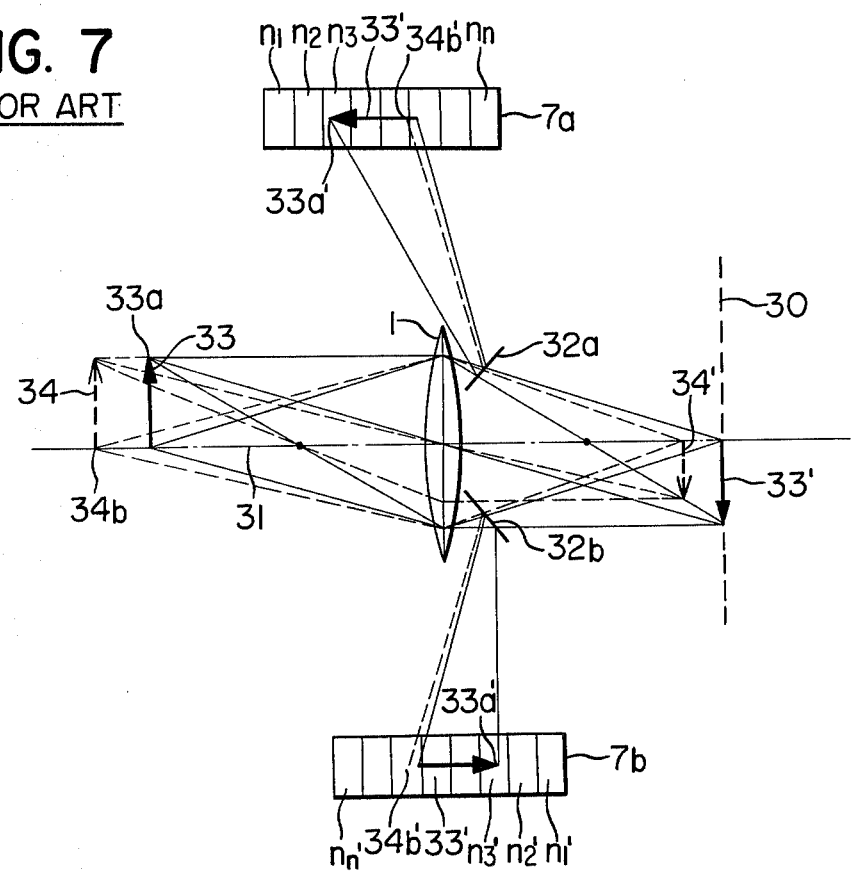

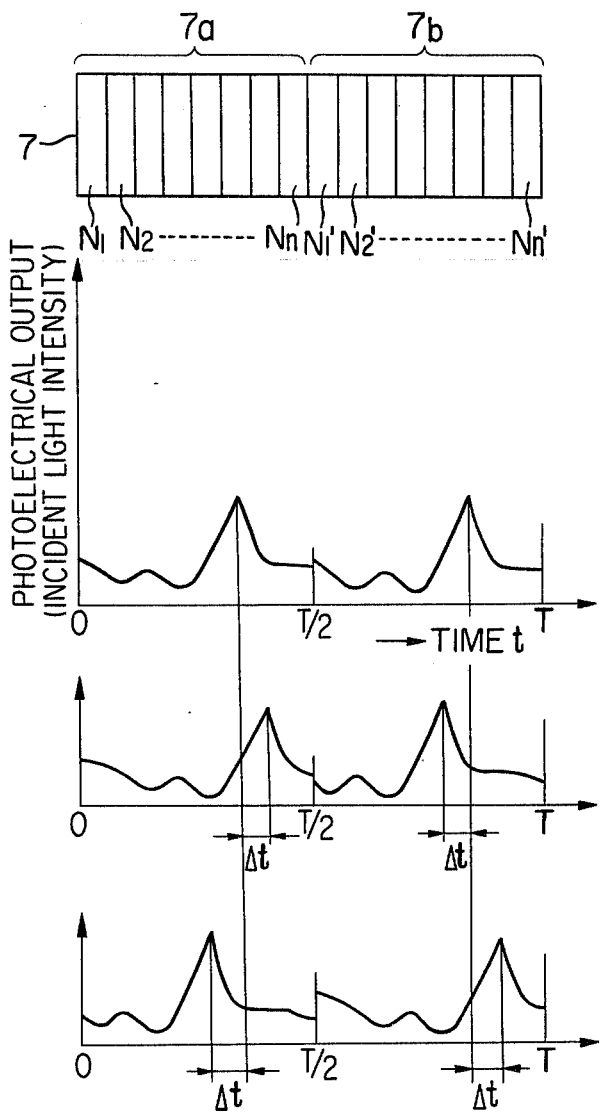

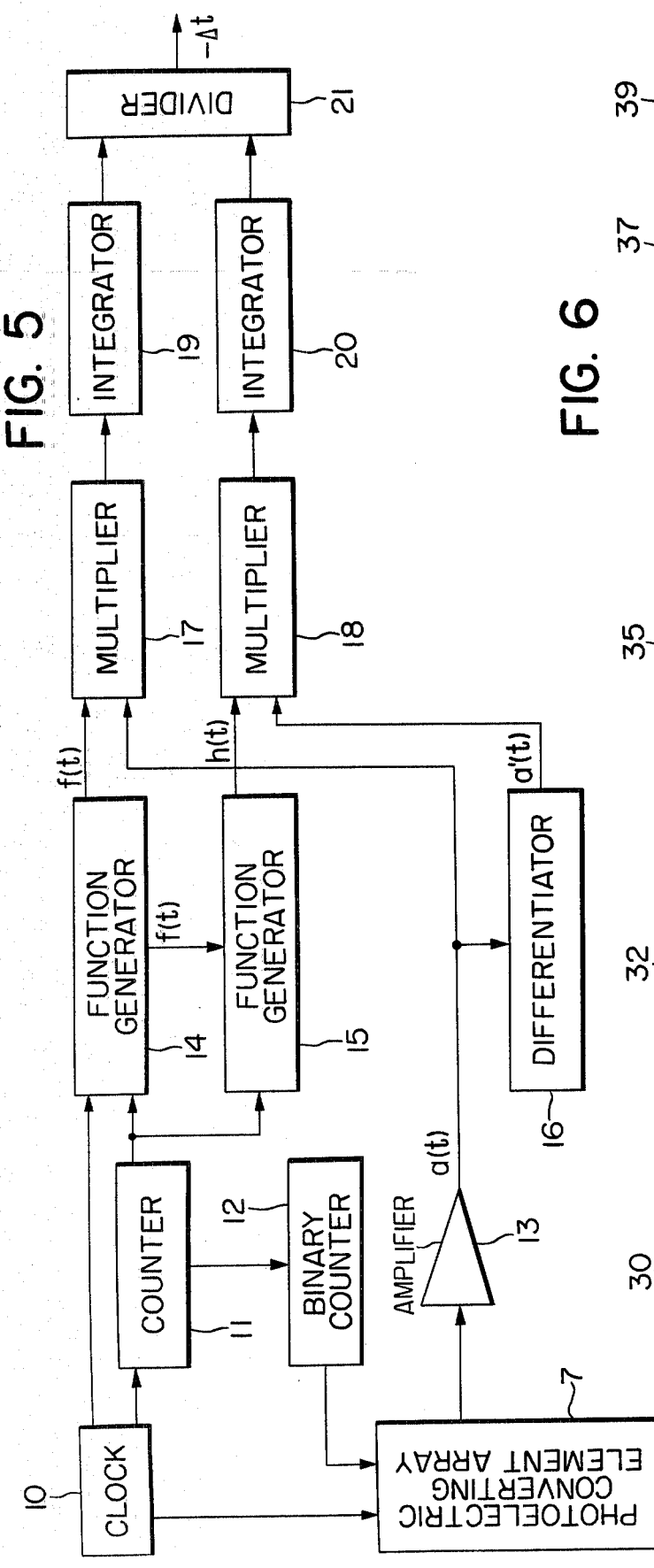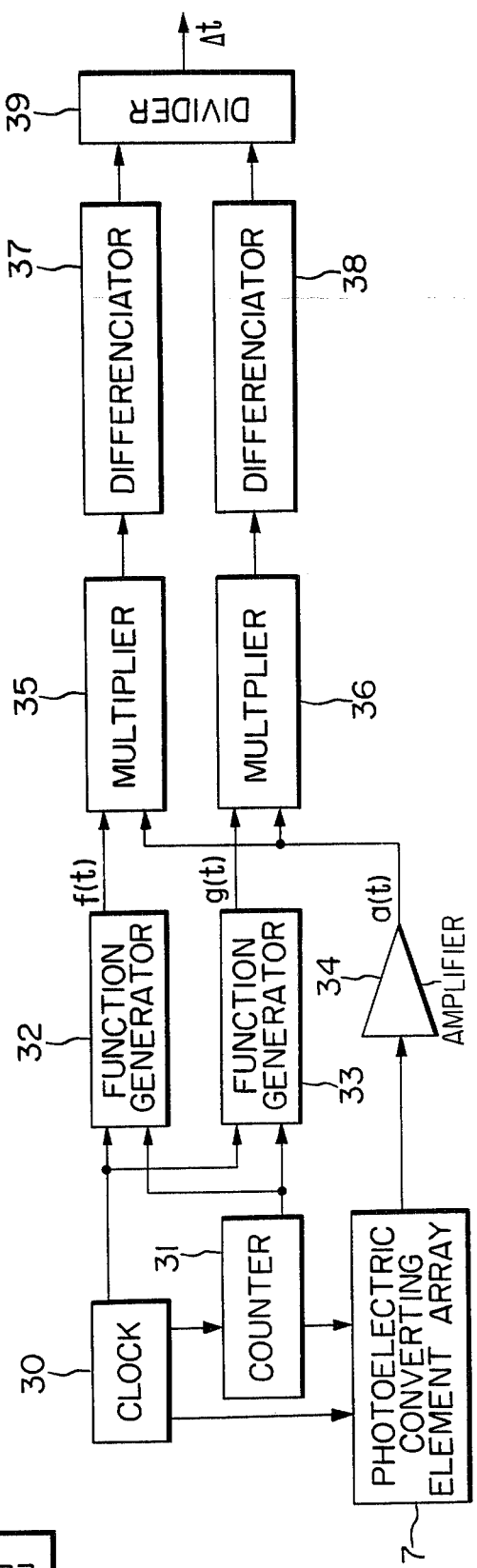

FOCUS CONDITION DETECTING DEVICE

BACKGROUND OF THE INVENTION

1. Field of the Invention

This invention relates to a focus condition detecting device in an image forming optical system.

2. Description of the Prior Art

The focus condition detecting device in the conventional image forming optical system has consumed much electric power because the photoelectric device or the image forming optical system is driven in the direction of the optic axis and has generated vibration and noise while encountering difficulties in making the device compact. To overcome these disadvantages, focus condition detecting devices in which a light image is moved on the light-receiving surface of a photoelectric device in accordance with the image forming position of the image forming optical system so that the focus condition is detected by the detection of this movement have been proposed in Japanese Open patent application Publication No. 15432/1976.

The technique disclosed in the aforementioned Publication will hereinafter be described by reference to FIG. 7 of the accompanying drawings.

In an image forming optical system comprising an image forming lens 1 and a fixed focal plane 30, small mirrors 32a and 32b functioning as a pair of light beam separating elements are disposed at positions spaced apart from the optic axis 31 just behind the lens 1. A photoelectric converting element array 7a comprising a number of photoelectric converting elements $N_1$, $N_2$, $N_3$, ..., $N_n$ each having a small light-receiving surface such as a photoconductor and a photoelectric converting element array 7b comprising similar photoelectric converting elements $N'_1$, $N'_2$, $N'_3$, ..., $N'_n$ are disposed at two positions of the reflecting optical system formed by the mirrors 32a, 32b which are conjugate with the fixed focal plane 30.

The light rays from an object 33 on the optic axis 31 form a light image 33' focused on the fixed focal plane 30. At this time, identical images are formed on the positionally corresponding elements $N_1 \cdot N'_1$, $N_2 \cdot N'_2$, ..., $N_n \cdot N'_n$ of the pair of photoelectric converting element arrays. For example, the light from the end 33a of the object 33 is imaged on the elements $N_3$ and $N'_3$, respectively, of the two element arrays. An object 34 indicated by a dash line lies at a position on the optic axis which is spaced further apart from the lens 1 than the object 33 and the light image 34' thereof is the front focus imaged at a location nearer to the image forming lens 1 than the fixed focal plane 30, namely, at a location before the fixed focal plane 30. At this time, the light image formed in an out-of-focus condition on the upper element array 7a is displaced leftwardly (toward $N_1$) from the light image 33' during the in-focus condition. The light image formed in an out-of-focus condition on the lower element array 7b is displaced leftwardly (toward $N'_n$) from the light image 33'.

In FIG. 7, for the sake of simplicity, only the light ray from a portion 34b of the object 34 which is on the optic axis 31 is indicated by dash line.

Although not shown, in the case of the rear focus imaged at a location further from the image-forming lens 1, conversely to the case of the front focus, the light image on the upper element array 7a is displaced rightwardly (toward $N_n$) from the light image 33', the light image on the lower element array 7b is displaced rightwardly (toward $N'_1$) from the light image 33'. That is, during the out-of-focus condition, the light images on the pair of element arrays are positionally deviated from each other.

According to this technique, the out-of-focus and the in-focus condition can be discriminated from each other by applying a circuit for comparing and discriminating the mutually corresponding elements (for example, $N_1$ versus $N'_1$, $N_2$ versus $N'_2$) of the pair of photoelectric converting element arrays.

However, said Publication does not disclose means for discriminating the front focus formed forwardly of the photoelectric converting element arrays and the rear focus formed rearwardly of the photoelectric converting element arrays.

SUMMARY OF THE INVENTION

I have conceived and contribute by the present invention means for detecting the information of the infocus condition and the amount of out-of-focus condition and the front focus and the rear focus, namely, the focus condition, with a hinge degree of accuracy.

There has thus been outlined rather broadly the more important features of the invention in order that the detailed description thereof that follows may be better understood and in order that the present contribution to the art may be better appreciated. There are, of course, additional features of the invention that will be described hereinafter and which will form the suject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIG. 1 shows the construction of an embodiment of the image forming optical system according to the present invention;

FIG. 2 shows the construction of another embodiment of the image forming optical system according to the present invention;

FIGS. 3A–3D each illustrate the output of a photoelectric converting element;

FIGS. 4A–4C each illustrates the function output waveforms in an embodiment of the present invention;

FIG. 5 is a block diagram showing a circuit for effecting the operation process in an embodiment of the present invention;

FIG. 6 is a block diagram showing a circuit for effecting the operation process in another embodiment of the present invention; and FIG. 7 shows the construction of a focus condition detecting device according to the prior art.

DESCRIPTION OF THE PREFERRED EMBODIMENTS

FIGS. 1 and 2 show embodiments of the image forming optical system according to the present invention. In FIG. 1, the light from an object 0 is converged into a light beam by an image forming lens 1. The light beam is separated into two light beams by a pair of relay lenses 5a and 5b as the light beam separating elements. These relay lenses 5a and 5b are disposed at symmetrical positions with respect to the optic axis of the image forming lens 1. A photoelectric converting element array 7 is disposed at the image forming positions of the pair of light beams. The photoelectric converting element array 7 comprises an upper photoelectric converting element array 7a consisting of photoelectric converting elements $N_1, N_2, \ldots, N_n$ and a lower photoelectric converting element array 7b consisting of photoelectric converting elements $N_1', N_2', \ldots, N_n'$. A view field diaphragm 3 is provided in the fixed focal plane of the image forming lens 1. The function of the view field diaphragm 3 is to render the length of the light image on the photoelectric converting element array 7 equal to one-half of the length of the photoelectric converting element array 7. The two light images on the photoelectric converting element array 7a and the photoelectric converting element array 7b are formed at positions of the two element arrays corresponding to each other during the in-focus condition. That is, the image formed on the element $N_2$ of the element array 7a is also formed on the element $N_2'$ of the element array 7b. During the front focus, both images come toward the center along the direction of the row of the elements of the photoelectric converting element array 7, and during the rear focus, both images are spaced apart toward the opposite ends along the direction of the row of the elements. At this time, the amounts of movement of the two images in the opposite directions are equal. Various optical systems in which two light images are so movable on the photoelectric converting element array perpendicular to the optic axis in accordance with the imaging forming position of the light beam are conceivable not only as shown in FIGS. 1 and 7 but also as shown in FIG. 2 in which the light beam from a relay lens 4 is separated into two light beams by a Wollaston prism 6 disposed on the optic axis and these two light beams are focused on the photoelectric converting element arrays 7a and 7b, respectively.

FIG. 3A shows the photoelectrical output, namely, the intensity of incident light, of one scan when the photoelectric converting element arrays 7a and 7b are time-sequentially repetitively scanned, with the ordinate representing the output and with the abscissa representing time, the output sequentially corresponding to the photoelectric converting element arrays 7a and 7b. FIG. 3B shows the output during the in-focus condition when the two light images formed by the pair of relay lenses 5a and 5b are formed so as to positionally correspond to the photoelectric converting element arrays 7a and 7b, respectively, namely, when the light of the same intensity distribution is thrown upon the individually corresponding photoelectric converting elements of the photoelectric converting element arrays 7a and 7b. FIG. 3C shows the output during the front focus condition when the light images are formed toward the center of the element array 7. FIG. 3D shows the output during the rear focus condition when the light images are formed toward the opposite ends of the element array 7.

Description will now be made of the operation process for detecting the focus condition from the output of the photoelectric converting element array which is the principle of the present invention.

First, it is assumed that the output of the photoelectric converting element array is a function a(t) of time t. However, if the time or period required to effect one scan of the entire photoelectric converting element array 7 is T, the output may be expressed as the following equation during the in-focus condition, as is apparent from FIG. 3A:

$$a(t+T/2)=a(t)$$

At this time, a function f(t) as shown in FIG. 6A is considered. This function f(t) approximates zero when t is 0, T/2 or T, and its waveform is smooth and satisfies the following condition:

$$f(t+T/2)=-f(t)$$

If the result obtained by integrating the product of the function $f(t)$ and the photoelectric output $a(i\ t)$ for one period is $S(o)$, $S(o)$ may be expressed as:

$$\begin{aligned} S(o) &= \int_0^T f(t)a(t)dt \\ &= \int_0^{T/2} f(t)a(t)dt + \int_{T/2}^T f(t)a(t)dt \\ &= \int_0^{T/2} f(t)a(t)dt + \int_0^{T/2} f(t+T/2)a(t+T/2)dt \\ &= \int_0^{T/2} f(t)a(t)dt - \int_0^{T/2} f(t)a(t)dt = 0 \end{aligned}$$

Thus, during the in-focus condition, $S(o)$ becomes zero.

The out-of-focus condition will now be considered. At such time, the light images are out of focus on the photoelectric converting element arrays 7a and 7b and due to the front focus of the rear focus, the two light images move towards the center of the photoelectric converting element array 7 with the same amount of movement, or they move away from each other toward the opposite ends of the photoelectric converting element 7. That is, as shown in FIGS. 3B and 3C, the output during the first half (time t is from O to T/2) is delayed by $\Delta t$ and the output during the second half (time t is from T/2 to T) is advanced by $\Delta t$. During the front focus, $\Delta \tau > 0$ and during the rear focus, $\Delta \tau < 0$. At this time, the photoelectrical output related to the light images newly having come to the ends of the photoelectric converting element 7a and 7b due to the displacement of the light images resulting from the front focus or the rear focus, namely, the photoelectrical output waveform in which time t corresponds to the vicinity of O, T/2 or T, can be eliminated by multiplying such output by the function $f(t)$ which approximates zero when time t is in the vicinity of O, T/2 or T and the following equation is established:

$$f(t)a(t+T/2)=f(t)a(t+2\Delta t)$$

If the result obtained by integrating this $f(t)a(t)$ for one period is $S(\Delta t)$, then $$\begin{aligned} S(\Delta t) &= \int_0^T f(t)a(t)dt \\ &= \int_0^{T/2} f(t)a(t)dt + \int_{T/2}^T f(t)a(t)dt \\ &= \int_0^{T/2} f(t)a(t)dt + \int_0^{T/2} f(t+T/2)a(T+T/2)dt \end{aligned}$$

-continued
$$= \int_0^{T/2} f(t)\{a(t) - a(t + 2\Delta t)\}dt$$

$$\approx \int_0^{T/2} f(t)(-2\Delta t)a'(t)dt$$

$$\begin{pmatrix} a'(t) \doteq \{a(t + 2\Delta t) - a(t)\}/2\Delta t \\ a(t) - a(t + 2\Delta t) = (-2\Delta t) = (-2\Delta t)a'(t) \end{pmatrix}$$

$$\therefore -\Delta t = \int_0^T f(t)a(t)dt/2 \int_0^{T/2} f(t)a(t)dt \quad (1)$$

Here, a function $h(t)$ as shown in FIG. 4B which satisfies the following condition is made in order to equalize the integration ranges of the numerator and denominator of equation (1):

$$h(t)=f(t) \ (0<t<T/2), \ h(t)=-f(t) \ (T/2<t<T)$$

By doing so, instead of the denominator of equation (1), i.e.

$$2\int_0^{T/2} f(t)a'(t) \, dt, \ \int_0^T h(t)a'(t)dt$$

may approximately be used. Accordingly, equation (1) becomes as follows:

$$-\Delta t = \int_0^T f(t)a(t)dt / \int_0^T h(t)a'(t)dt \quad (1)'$$

The embodiment in which this equation (1)' is electrically operated and processed is shown in the block diagram of FIG. 5.

A counter 11 receives the supply of clock pulses from a clock 10 and supplies a pulse to a binary counter 12 and function genertors 14, 15 at each half period $T/2$. By said input, the binary counter 12 supplies a pulse to the photoelectric converting element array 7 at each period. The photoelectric converting element array 7 effects scanning by the clock pulse and repeats the scanning at each period with the pulse at each period $T$ from the binary counter 12 as the start pulse. The function generator 14 receives the supply of the clock pulses and the pulse at each half period and puts out the function $f(t)$ sequentially corresponding to the photoelectric converting element array 7 as shown in FIG. 4A. The function generator 15 is supplied with the function $f(t)$ from the function generator 14 and reverses the sign by a half period pulse and puts out the function $h(t)$ sequentially corresponding to the photoelectric converting element array 7 as shown in FIG. 4B. The output $a(t)$ of the photoelectric converting element array 7 is amplified by an amplifier 13. A multiplier 17 multiples the output $f(t)$ of the function generator 14 by the amplified photoelectrical output $a(t)$ and supplies the result to an integrator 19. The integrator 19 integrates $f(t) \cdot a(t)$ for one period and supplies the result to a divider 21. The multiplier 18 multiplies the output $h(t)$ of the function generator 15 by an output $a'(t)$ resulting from differentiating the amplified photoelectrical output $a(t)$ by a differentiator 16 and supplies the result to an integrator 20. The integrator 20 integrates $h(t) \cdot a'(t)$ for one period and supplies the result to a divider 21. The divider 21 effects division in the form of equation (1)' and puts out $-\Delta t$.

In the previous embodiment, $\Delta t$ is obtained from the differentiation of the photoelectrical output $a(t)$, but an embodiment in which $\Delta t$ is obtained from the differentiation of the function $f(t)$ will now be shown. Since $t$ is in the vicinity of $O$, $T/2$ or $T$ and $f(t) \approx 0$, $$S(\Delta t) = \int_0^{T/2} \{f(t)a(t) - f(t)a(t + 2\Delta t)\}dt$$

$$\approx \int_0^{T/2} \{f(t)a(t) - f(t - 2\Delta t)a(t)\}dt$$

$$\approx \int_0^{T/2} a(t)(2\Delta t)f'(t)dt$$

$$= 2\Delta t \int_0^{T/2} f'(t)a(t)dt$$

$$\therefore \Delta t = \int_0^T f(t)a(t)dt/2 \int_0^{T/2} f(t)'a(t)dt \quad (2)$$

Here, a function $g(t)$ as shown in FIG. 4C which satisfies the following conditions is made in order to equalize the integration ranges of the numerator and denominator of equation (2):

$$g(t)=f'(t) \ (0<t<T/2)$$

$$g(t)=-f'(t) \ (T/2<t<T)$$

Instead of $$2\int_0^{T/2} f'(t)a(t)dt$$

which is the denominator of equation (2), $$\int_0^T g(t)a(t)dt$$

can be used.

Accordingly, equation (2) becomes as follows:

$$\Delta t = \int_0^T f(t)a(t)dt / \int_0^T g(t)a(t)dt \quad (2)'$$

The embodiment in which this equation (2)' is electrically operated and processed is shown in the block diagram of FIG. 6.

A clock 30 supplies clock pulses to the photoelectric converting element array 7, a counter 31 and function genertor 32, 33. The counter 31 receives the clock pulses and supplies a pulse to the photoelectric converting element array 7 and the function generators 32, 33 at each period. The photoelectric converting element array 7 repeats scanning at each period by said input and puts out the photoelectrical conversion output $a(t)$. The function generator 32 receives this input and supplies the function $f(t)$ to a multiplier 35. The function generator 33 also receives that input and supplies the function $g(t)$ as shown in FIG. 4c to a multiplier 36. The photoelectrical output $a(t)$ is amplified by an amplifier 34 and supplied to multipliers 35, 36. The multipliers 35 and 36 supply $f(t) \cdot a(t)$ and $g(t) \cdot a(t)$ from the aforesaid inputs to integrators 37 and 38. The integrators 37 and 38 integrate the inputs for one period and supply the result to a divider 39. The divider 39 effects division in the form of equation (2)' and puts out $\Delta t$. The function $g(t)$ may be made from an output resulting from differentiating the function $f(t)$ by a differentiator, but since the function output $f(t)$, unlike the photoelectrical output $a(t)$, is a known function, the separate function generator 33 has been used.

The output value $\Delta t$ of equations (1)' and (2)' represents the amount of out-of-focus, and represents the front focus when it is positive and represents the rear focus when it is negative.

Some examples of the function $f(t)$ ($O<T/2$) will be enumerated below.

$$f(t) = 1 - \cos(4\pi t/T) \quad (1)$$

$$f(t) = 1 - \cos(8\pi t/T) \quad (2)$$

$$f(t) = 1 - \cos(12\pi t/T) \quad (3)$$

$$f(t) = \sin(4\pi t/T) \quad (4)$$

$$f(t) = \sin(2\pi t/T) \quad (5)$$

In the present embodiment, in order to equalize the integration ranges of the numerator and denominator of the $\Delta t$ calculating equation (equations (1) and (2)), integration of $$\int_0^T h(t)a(t)dt$$

(denominator of equation (1)') or $$\int_0^T g(t)a(t)dt$$

(denominator of equation (2)') has been effected, but as seen from equations (1) and (2), obtainment of $\Delta t$ can be achieved as a rule by obtaining at least $$\int_0^{T/2} f(t)a'(t)dt \text{ or } \int_0^{T/2} f'(t)a(t)dt$$

or a value approximate thereto.

The operational devices such as the multipliers are dividers used in the present embodiment are circuits for obtaining as the output the result of the operations such as multiplication and division, and these multipliers and dividers of course include circuits in which, for example, numerical values are transformed into logarithms and the outputs of multiplication and division may be obtained by addition and subtraction.

In the present embodiment, a single photoelectric converting element array is divided into two and scanning is made thereby, whereas it is of course possible to use a first and a second photoelectric converting element array to effect the operation process time sequentially from the first photoelectric converting element array to the second photoelectric converting element array. However, in this case, unlike the case where a single photoelectric converting element array is divided into two, the characteristics of the two elements must be coincident with each other.

In the present embodiment, the operation process is effected time-sequentially, whereas it is also possible to take out each output at the same time and effect the operation process in parallel.

According to the present invention, as has been described above, the information on the in-focus and the out-of-focus, namely, the front focus and the rear focus, can be detected with the amount of out-of-focus and therefore, automatic focus adjustment is enabled by combining the present device with a lens driving device. Also, the absence of any mechanical driving portion leads to the elimination of the problems of vibration and noise as well as to the compactness of the device.

I believe that the construction and operation of my novel focus condition detecting device will now be understood and that the advantages thereof will be fully appreciated by those persons skilled in the art.

We claim:

1. A focus condition detecting device comprising:
   (a) an image forming optical system for converging the light from an object into a light beam and forming a light image of said object on a fixed focal plane;
   (b) an element for separating a pair of light beams from said first mentioned light beam;
   (c) a first and second photoelectric converting element array disposed in said pair of light beams so that the light images on said element arrays are displaced in the direction of a row of said elements in accordance with the focus condition of said light images;
   (d) a first function generator for generating a first function output of smooth waveform sequentially corresponding to said first photoelectric converting element array and a second function output sequentially corresponding to said second photoelectric converting element array and having a sign reversed with respect to said first function output;
   (e) a first multiplier for putting out the sum of an output resulting from multiplying the first photoelectrical output of said first photoelectric converting element array by said first function output and an output resulting from multiplying the second photoelectrical output of said second photoelectric converting element array by said second function output;
   (f) a first integrator for integrating the output of said first multiplier;
   (g) a second function generator for generating an output equivalent to an output resulting from differentiating one of said first photoelectrical output and said first function output;
   (h) a second multiplier for multiplying the other of said first photoelectrical output and said first function output by the output of said second function generator;
   (i) a second integrator for integrating the output of said second multiplier; and
   (j) a divider for dividing the output of said first integrator by the output of said second integrator.

2. A focus condition detecting device according to claim 1, wherein the levels of the first and second function outputs sequentially corresponding to the vicinity of the opposite ends of said first and second photoelectric converting element arrays and the output of said second function generator are made to approximate zero level.

3. A focus condition detecting device according to claim 1, wherein the photoelectrical outputs of the photoelectric converting elements of said first photoelectric converting element array are taken out time-sequentially, whereafter the photoelectrical outputs of the photoelectric converting element of said second photoelectric converting element array are taken out time-sequentially, said first function generator puts out the first and second function outputs so as to time-sequentially correspond to the first and second photoelectrical outputs, and said first and second photoelectrical outputs and said first and second function outputs are time-sequentially operated and processed.

4. A focus condition detecting device according to claim 1, wherein said first and second photoelectric converting element arrays are provided by dividing a single photoelectric converting element array into two arrays.

5. A focus condition detecting device according to claim 3, wherein said second function generator time-sequentially repetitively generates an output equivalent to an output resulting from differentiating the first function output, and said second multiplier multiplies alternately the first and second photoelectrical outputs by the output of said second function generator generated time-sequentially.

* * * * *

UNITED STATES PATENT AND TRADEMARK OFFICE
CERTIFICATE OF CORRECTION

PATENT NO. : 4,253,752
DATED : March 3, 1981
INVENTOR(S) : YUTAKA ICHIHARA

It is certified that error appears in the above-identified patent and that said Letters Patent are hereby corrected as shown below:

Column 2, line 22, change "hinge" to --high--.

Column 4, line 18, change " a(i t) " to -- a(t) --;

line 35, change "focus of" to --focus or--.

Column 6, in line 3 of Equation (2), change " f " to -- f' --;

in line 4 of Equation (2), change " f " to -- f' --;

line 23, change "f" to -- f' --;

line 25, change "f" to -- f' --;

line 30, change "f" to -- f' --.

UNITED STATES PATENT AND TRADEMARK OFFICE
CERTIFICATE OF CORRECTION

PATENT NO. : 4,253,752
DATED : March 3, 1981
INVENTOR(S) : YUTAKA ICHIHARA

It is certified that error appears in the above-identified patent and that said Letters Patent are hereby corrected as shown below:

Column 7, line 8, change " $(0<T/2)$ " to -- $(0<t<T/2)$ --;

line 37, change " f " (second occurrence) to -- f' --;

line 41, change "are" to --and--.

Signed and Sealed this

Twelfth Day of May 1981

[SEAL]

Attest:

RENE D. TEGTMEYER

Attesting Officer

Acting Commissioner of Patents and Trademarks